July 9, 1929.   D. A. REED   1,720,437
AUTOMOBILE HEADLIGHT
Filed Jan. 8, 1925
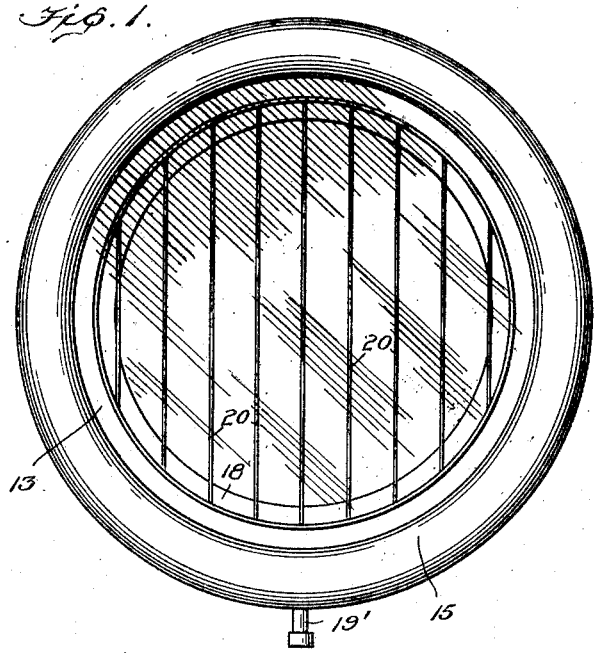
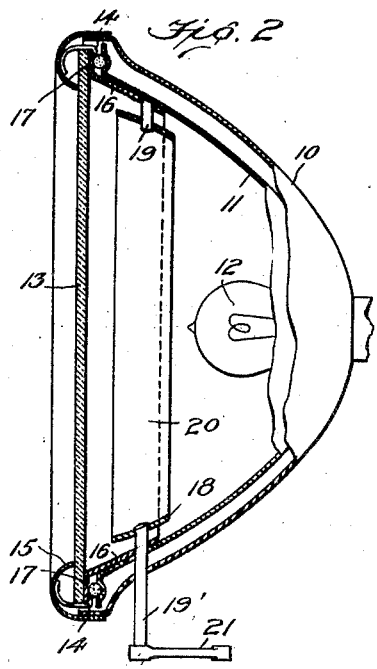
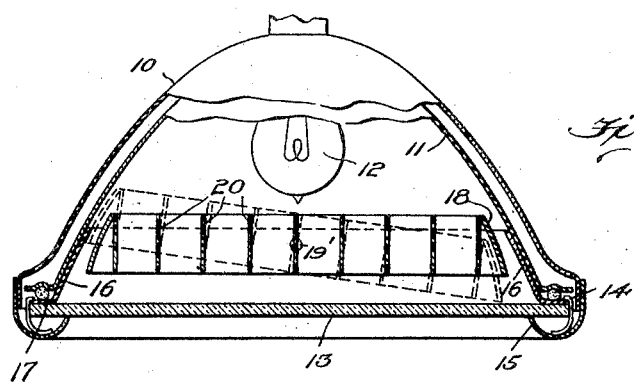
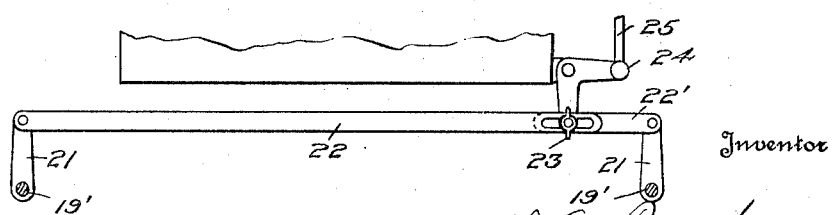

Patented July 9, 1929.                                                      1,720,437

UNITED STATES PATENT OFFICE.

DANIEL A. REED, OF DUNKIRK, NEW YORK.

AUTOMOBILE HEADLIGHT.

Application filed January 8, 1925. Serial No. 1,170.

This invention relates to headlights for automobiles, and is directed particularly to reducing the glare, without the corresponding reduction of adequate illumination. In the automobile headlights as now in common use, as two cars equipped therewith approach each other in passing, there is a glare from each, projected into the zone of vision of the driver of the other car, which creates at or near the point of passing, a danger zone through which each driver must pass, as well as to any pedestrians that may be using the same highway.

The primary object of this invention is to reduce this glare, and to eliminate the danger zone at the point of approach and passing of meeting automobiles.

This object is attained by means of an attachment or co-operative element for automobile headlights, which can readily be applied to any of the several forms of automobile headlights now in common use, and by which the beams of light from the lamp reflector may be so controlled in their projection, that they will be limited to a fixed and restricted area, without reducing the intensity of the beams of light directed to illuminate the roadway over which the car is approaching.

The invention consists in the details of construction and arrangement of the parts hereinafter more fully described and particularly pointed out in the claims.

In the accompanying drawings forming a part of this specification,

Fig. 1 is an elevational view of the device; Fig. 2 is a view of a headlight partly broken away, and having the invention applied thereto; Fig. 3 is a horizontal section; and Fig. 4 is a detail of the means for operating the movement of the device.

It will be understood that I do not limit myself to the specific form of device shown in the drawings, as I may employ other forms to carry out the spirit of my invention.

Referring to the drawings, 10 indicates a headlight casing of the usual form, 11 the parabolic reflector, 12 the light source, 13 the lens, 14 the lens seat, 15 the rim of the headlight casing which holds the lens 13, against the seat 14.

To those skilled in the art, it will be observed that my invention comprises a co-operative element adapted to be placed within the headlight casing, intermediate of the lens and the light source, and comprises an annular ring member 16, positioned in concentric relation with the rim 15 of the headlight casing.

To maintain the annular ring member 16 in a fixed position, there is formed on its outer edge a flanged rim 17 adapted to be interposed between the lens 13, and the lens seat 14, a form of fastening well known in the art.

Mounted within the annular member 16 and concentric therewith, is an inner annular member 18, adapted to form the supporting means for the light beam controlling means. The light beam controlling means comprises a plurality of vertically disposed partition members or slats 20. These slats 20 are fixedly mounted in parallel relation to each other on the inner surface of the annular member 18, and form therewith an integral part of the co-operating element herein referred to as the light beam control.

The inner annular member 18, is mounted within the annular member 16, on the vertically disposed trunion members 19 and 19' which pass through and have bearing contact in the annular member 16. By this form of mounting the annular member 18, is adapted to be oscillated in a horizontal plane, upon and with respect to the annular member 16.

For the purpose of conveying oscillating movement to the member 18, the lower trunion member 19' is adapted to extend through the casing body to a point exterior thereof, and to have mounted on such extension, the bell crank 21.

In the usual application of illuminating means for automobiles, a pair of companion headlights are mounted in spaced relation on the front end of the car. In carrying out my invention, it is desired to maintain the horizontal axis of the slats 20 of the one headlight beam control, in fixed relation with the same axis or the slats 20 comprising the light beam control of the companion light. This may be a parallel relation, or it may be at a slight angle, the positioning of which forms one of the features of this invention, the details of which will herein after be more fully explained.

To maintain the determined relative position of the faces of the slats 20 of the one light, with the corresponding faces of the slats 20 of the other companion light, the cross bar 22 is suitably connected to the bell crank 21, mounted on the extended trunnion 19' of each companion light.

The cross bar 22 has at the one end, a slidable extension 22' which is adapted to be fixed in extended position on the cross bar 22, by the thumb nut 23, and by which a variation of the position of angularity of the faces of the slats 20 of the one light, may be had with the corresponding faces of the slats 20 of the other companion light.

To provide for changing the setting of the angularity of the faces of the slats 20, the cross bar 22 is suitably connected to the actuating crank 24, which is connected to the rod 25, extending to an operative position within the dash cowl (not shown).

The mounting of the annular member 18 of each of the companion lights for oscillating movement, facilitates placing the faces of the slats 20 of the one light either in a parallel, or in an angular relation to the faces of the slats 20 of the other companion light.

The rays of light projected directly foreward from the light source, pass through the intervening spaces between the slats 20. This intervening space which will allow a direct beam of light to pass therethrough, may be diminished by changing the angularity of the faces of the slats 20 with the axis of the light beams emanating from the light source. This is accomplished by an oscillating movement of the light beam control element, comprising the annular member 18, supporting the slats 20, in a horizontal plane, and when this movement is directed to the right, or clockwise, the angularity of the faces of the slats positioned to the left of a medial line with the vertical axis of the light source, will be correspondingly increased, in ratio as the slats are increasingly spaced apart from the medial line. By the clockwise movement of the light control member referred to, the planes of the slats on the right of the medial line referred to, are correspondingly brought into nearer alignment with the point of light source.

As the oscillating movement of the light control member is inaugurated, the light beams ordinarily passing through the intervening space between the slats farthest to the left of the medial line referred to, will be the first light beams to be arrested and cut off. Correspondingly, the planes of the slats positioned to the right of the medial with the point of light source, will be progressively brought into parallel relation with a line extending from each slat to the light source, and will thereby, direct the light beams to the right, or at an angle to the medial line of the light source. This will have the effect of producing a greater illumination on the right hand side of the road over which the car is passing.

To those skilled in the art, it will be apparent that by the means herein disclosed, that the glare of the headlight will be progressively cut off on the left, or on that portion of the road over which an approaching vehicle is traveling, and that the illumination of the roadway to the right, will be correspondingly increased. This will be accomplished by the oscillating movement of the light beam control element in itself, or by the gradual turning of the car to the right, in giving way to an approaching vehicle.

When the degree of angularity of the slats has once been determined as the most effective position to properly eliminate the glare, by the turning of the car itself, such angularity may be fixed, and the manually operated means dispensed with.

It will also be apparent to those skilled in the art, that the angularity of the light beam control element of one of the companion lights, may be adapted to reduce the amount of light beams passing therethrough to a greater degree than through the other companion light, and when this angularity is increased with respect to the left hand companion light, there will be a corresponding diminishing of the glare on the left side of the roadway being approached.

The slats 20 may be formed of any thin metal as may be found best adapted for the purpose, and to add to the efficiency of their functioning, the side of the slats adapted to direct the light beams to the right are provided with burnished or mirrored surfaces, and the opposite sides of the slats are provided with a non-reflecting or dull surface so as to absorb the light rays projected thereon.

The angle of deflection at which the slats 20 may be positioned to obtain the results sought, is comparatively slight, but the capabilities of deflection may be sufficient to render my device available for use in those localities having "dimming" ordinances, and to more effectively carry out this function, the slats may be increased and placed in closer relation.

Having thus described my invention, what I claim and desire to secure by Letters Patent is—

1. In a headlight for vehicles, a casing, a reflector therein, a source of light mounted centrally of the reflector, and a unitary pivoted structure operable on a vertical axis and including vertical vanes for deflecting outwardly from the path of travel, when said unitary structure is shifted, the greater portion of the direct rays from the source of light and simultaneously reducing the number of reflected rays near the opposite side of the path of travel, all of the rays being projected in an approximately horizontal beam.

2. A device constructed and operating as specified in claim 1, in which said unitary structure comprises a plurality of spaced parallel vanes having fixed relation to each other.

In testimony whereof I have affixed my signature.

DANIEL A. REED.